No. 826,798. PATENTED JULY 24, 1906.
A. PETERMAN.
COFFEE POT.
APPLICATION FILED JAN. 23, 1904.

2 SHEETS—SHEET 1.

Witnesses
F. W. Rey.
Chas. S. Hyer.

Inventor
Bert Peterman.
By Victor J. Evans
Attorney

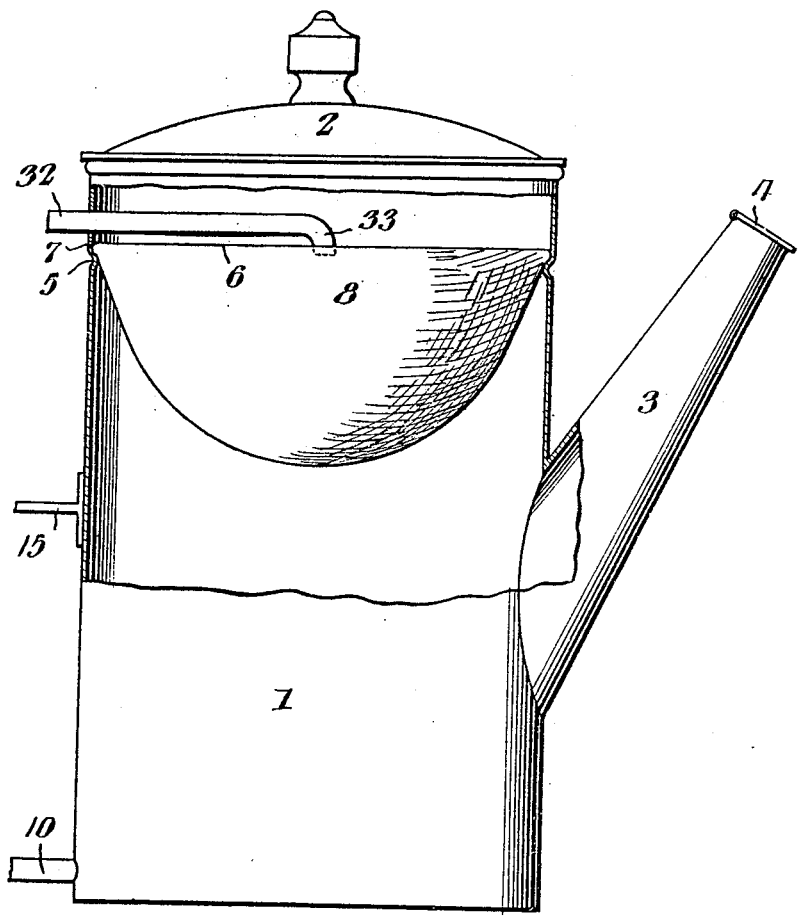

UNITED STATES PATENT OFFICE.

ALBERT PETERMAN, OF DALLAS, TEXAS.

COFFEE-POT.

No. 826,798.	Specification of Letters Patent.	Patented July 24, 1906.

Application filed January 23, 1904. Serial No. 190,360.

*To all whom it may concern:*

Be it known that I, ALBERT PETERMAN, a citizen of the United States, residing at Dallas, in the county of Dallas and State of Texas, have invented new and useful Improvements in Coffee-Pots, of which the following is a specification.

This invention relates to coffee-pots or the like; and the primary object of the same is to provide a simple and effective device of this class having means which also serves as a handle for transferring the contents of the lower part of the body of the coffee-pot or the like to the upper portion thereof over a receptacle for holding coffee, tea, or other material to permit the elevated contents to percolate through the coffee or substance in the receptacle and properly maintain the strength of the beverage adapted to be dispensed from the pot.

A further object of the invention is to provide a coffee-pot or other culinary device with means for elevating the lower portion of the contents thereof to the upper part of the pot or device having an organization of separable elements that can be easily reached for cleaning and other purposes.

A further object of the invention is to reduce the parts necessary to perform the operation desired to a minimum and also to provide a coffee-pot or analogous device with mechanism for elevating the contents thereof from the bottom of the pot to the upper part of the latter without modifying the structure of said body.

A further object of the invention is to include in the elevating attachment such organization of valve elements that the heated liquid will be permitted to run back to the lower part of the body after cessation of the pumping operation, and thereby avoid heating the handle embodying the attachments.

The invention consists in the construction and arrangement of the several parts, which will be more fully hereinafter set forth.

Figure 1:
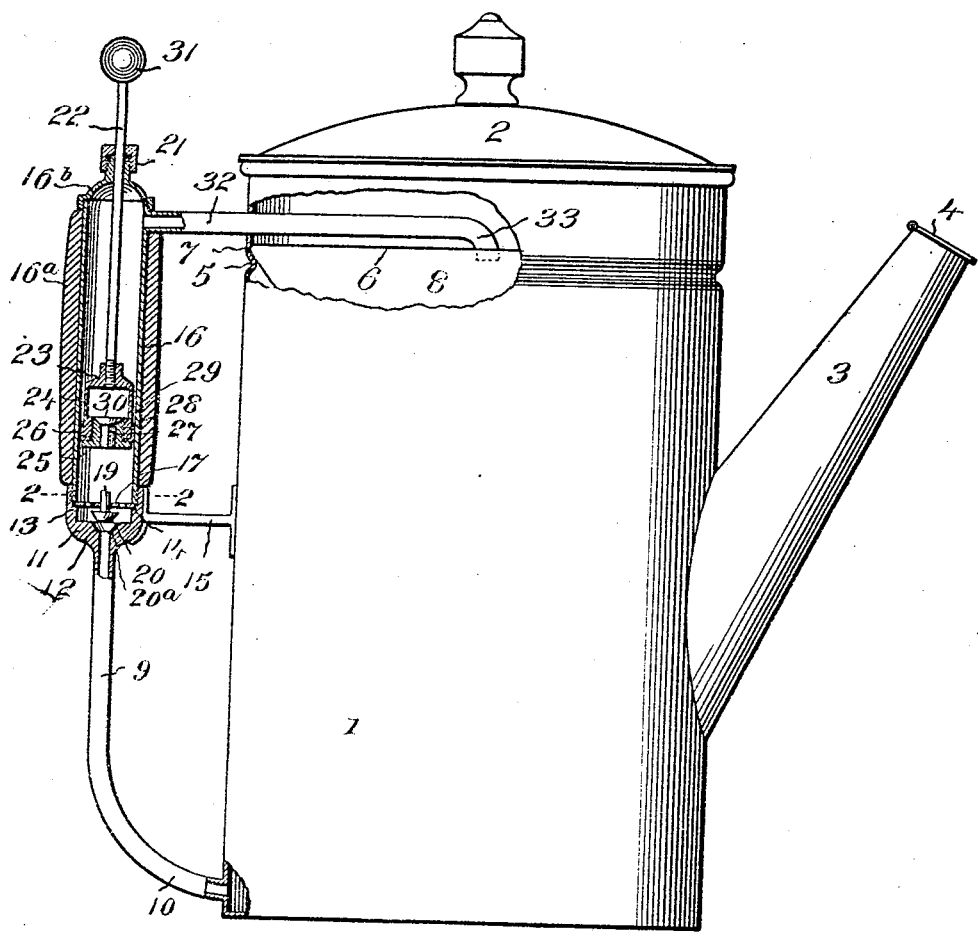
Figure 2:
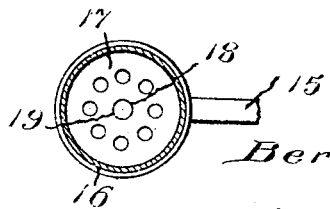

In the drawings, Figure 1 is a side elevation of a coffee-pot, shown broken away in part and illustrating the handle mainly in section and embodying the improved attachments. Fig. 2 is a horizontal section on the line 2 2, Fig. 1, with the lower valve removed. Fig. 3 is a side elevation of the upper portion of a coffee-pot, broken away and illustrating a holding-receptacle therein.

Similar numerals of reference are employed to indicate corresponding parts in the views.

The numeral 1 designates a coffee-pot of any suitable dimensions having a closing lid or cover 2 and a pouring-spout 3, with a hinged cap 4 to preserve the strength and aroma of the contents of the body of the pot. The upper part of the pot-body has an inwardly-struck seat-corrugation 5, which supports a removable receptacle 6, comprising, preferably, an upper ring 7 with a fabric body 8 of suitable dimensions. The receptacle 6 is fully open at its upper extremity and gradually reduces in diametrical extent toward its lower terminal or is practically of inverted conical contour. The receptacle is adapted to receive coffee, tea, or other material, and thereon is delivered hot water or the contents in the lower part of the pot-body similar to the operation of making coffee or other beverage in what is known as a "drip-pot."

The essential part of the attachment consists of a pumping means arranged as a handle and comprises a lower reduced pipe or conduit 9, with a gradually-curved terminal 10, connecting with the bottom of the pot-body. The upper end of the pipe or conduit 9 has an enlargement 11 thereon formed with a valve-seat 12, to which the door of the pipe or conduit leads. The valve-seat 12 is grooved, as at $12^a$, to permit the pump to drain or allow the liquid that may be above the valve 20 and the plunger, which will be hereinafter set forth, to flow back into the pot-body without interfering with the suction of the piston during the pumping operation.

Rising from the enlargement 11 is a circumferential flange 13, which is interiorly screw-threaded and has an annular shoulder 14 at the lower terminals of the interior threads at an elevation above the valve-seat 12. Projecting from the enlargement 11 is a connecting-brace 15, which is attached to the pot-body. The handle also includes an upper pump barrel or tube 16 of materially greater diameter than the pipe or conduit 9 and having its lower end removably inserted in the flange 13. The barrel or tube 16 has a surrounding heat-non-conducting covering $16^a$, preferably of wood, and a removable screw-threaded cap $16^b$. Between the lower end of the barrel or tube 16 and the shoulder 14 a perforate plate 17 is interposed and has an enlarged central opening 18, through which movably projects the stem 19 of a gravitating valve 20, the latter coöperating with the seat 12. On the upper end of the cap 16<sup>b</sup> of the barrel or tube 16 is a stuffing-box 21 of suitable construction, and movable centrally therethrough is a piston-rod 22, detachably secured at its lower end to the head 23 of a piston-yoke 24, having the lower terminals of its arms removably secured to a piston 25, a loose leather or fiber packing 26 being held between the ends of the yoke-arms and the head to establish a tight joint between the said head and the inner surface of the barrel or tube 16. Extending vertically through the center of the head 25 is an opening 27, leading to a valve-seat 28, formed in the center of the upper end of the head, and movably extending through said opening is a stem 29, having on its upper end a valve 30, movable in relation to the seat 28. The upper end of the piston-rod 22 has a ball or other suitable grip device 31 thereon for convenience in vertically reciprocating the piston-head. Attached to the upper extremity of the barrel or pipe 16 is a horizontal outlet conduit or pipe 32, which extends through an opening in the pot-body and has its inner terminal downwardly curved to form a delivery-spout 33, which is disposed over the center of the receptacle 6.

The receptacle 6 having been disposed in the upper part of the pot, coffee or other analogous material is placed therein and boiling water poured thereover. The water percolates through the coffee and the fabric 8, forming the main body of the receptacle, and falls into the lower part of the pot-body. This operation may be successively carried on until a large quantity of liquid is contained in the pot below the receptacle 6. It will be understood that the required strength and advantageous aroma of the contents of the pot-body below the receptacle 6 will be materially increased by repeatedly causing the same to flow through the contents of the said receptacle 6. For this purpose the pumping attachment embodied in the handle is used, and by drawing upwardly on the piston-rod 22 and elevating the piston-head 25 the valve 20 will be raised from its seat, and the liquid in the lower part of the pot-body will be drawn outwardly through the pipe or conduit 9 and pass through the perforate plate 17 into the pump barrel or tube 16 in quantity proportionate to the upstroke of the piston-head. On the downstroke of the said head the valve 20 will be forced from its seat and the valve 30 opened or elevated, thereby allowing the liquid below the piston-head to flow through the latter into the upper part of the barrel or tube 16. Successive operations of the piston-rod and its head will cause the liquid in the lower portion of the pot-body to be elevated and pass through the outflow conduit or pipe 32 and be delivered over the contents of the receptacle 6.

After the pumping operation is completed the piston-rod may be forced downwardly to avoid material projection thereof, and what portion of the heated liquid that may remain in the pipe or conduit 9 will flow back into the pot and prevent heating the handle of the latter embodying the pump-attachment. In the event that there should be any tendency toward sticking of the valves the projecting stems will contact and force the valve 20 down to its seat and raise the valve 30. At any time desired the parts may be separated for cleaning, and changes in the dimensions and proportions of the same may also be adopted in consonance with the variations of the sizes of pots. The perforate plate 17 serves as an efficient support for the valve 20 and its stem 19, so that said valve will always be held in central position.

One of the main advantages of the improved construction is that hot water may be first placed in the lower part of the pot-body and the lid or cover 2 applied over the upper end of the latter. The water may then be elevated to the receptacle 6 and percolated through the coffee or other material in the latter. By this means the full strength or aroma of the coffee or other material will be preserved by reason of the inclosure of the water, and all vapors that may be formed are held within the pot-body. Furthermore, a more extended surface to receive the water is provided by the form of receptacle before explained, and, furthermore, the ordinary pot-body may be used without changing the structure of the same, thereby reducing the cost of manufacture.

Having thus fully described the invention, what is claimed as new is—

A pot comprising, in combination, a body having a pouring-spout and a cover, a receptacle removably mounted in the upper part of the body below the cover, a hollow handle disposed externally of and parallel with the body of the pot and threaded at its lower end, an eduction-pipe communicating at its lower end with the body of the pot and enlarged at its upper end to form a valve-chamber, said valve-chamber having a shoulder and a threaded portion to engage the lower threaded end of the handle, a perforated guide-plate clamped against said shoulder by the handle, a valve controlling the passage in the eduction-pipe and provided with a stem slidable in said guide-plate, a pipe extending laterally from the upper end of the handle and projecting through the wall of the pot below the cover and forming a combined induction connection and stay for the top of the handle, a valve-pump piston in the handle, a stem connected to said piston and extending outwardly through the upper end of the handle and provided with a handhold, whereby the tubular handle forms a direct connection between the eduction and induction pipes and serves additionally as a pumpcylinder, the stem of the valve in the valve-chamber of the eduction-pipe being so arranged as to be engaged by the pump-piston at the limit of the downward movement of the latter to positively close said valve and prevent it from sitcking, substantially as described.

In testimony whereof I affix my signature in presence of two witnesses.

BERT PETERMAN.

Witnesses:
F. K. MUNSON,
R. L. MCMINN.

Caylor,     676,353,   June 11, 1901,
Stoll,      516,318,   Mar. 13, 1896,
Walther,    619,645,   Feb. 14, 1899,